United States Patent [19]

Froning et al.

[11] 4,187,907

[45] Feb. 12, 1980

[54] WATERFLOOD METHOD USING SURFACTANTS

[75] Inventors: H. Robert Froning; William W. Owens, both of Tulsa, Okla.; Duane L. Archer, Dallas, Tex.

[73] Assignee: Standard Oil Company (Indiana), Chicago, Ill.

[21] Appl. No.: 935,412

[22] Filed: Aug. 21, 1978

Related U.S. Application Data

[63] Continuation of Ser. No. 810,129, Jun. 27, 1977, abandoned.

[51] Int. Cl.$^2$ .............................................. E21B 43/22
[52] U.S. Cl. .................................. 166/275; 166/305 R
[58] Field of Search ........... 166/273, 274, 275, 305 R, 166/269; 252/8.55 D

[56] References Cited

U.S. PATENT DOCUMENTS

| | | | |
|---|---|---|---|
| 3,123,135 | 3/1964 | Bernard et al. | 166/275 X |
| 3,141,501 | 7/1964 | Bernard et al. | 166/275 X |
| 3,470,956 | 10/1969 | Boston et al. | 166/273 |
| 3,480,080 | 11/1969 | Murphy | 166/275 X |
| 3,498,379 | 3/1970 | Murphy | 166/275 |
| 3,677,344 | 7/1972 | Hayes et al. | 166/252 |
| 3,871,454 | 3/1975 | Harrison | 166/275 |
| 3,939,911 | 2/1976 | Maddox, Jr. et al. | 166/275 X |
| 4,016,932 | 4/1977 | Kalfoglou | 166/275 X |

*Primary Examiner*—Stephen J. Novosad
*Attorney, Agent, or Firm*—Fred E. Hook

[57] ABSTRACT

A method for improving the sweep efficiency of a waterflood comprising the addition of a small amount of a surfactant, preferably a petroleum-derived sulfonate, to at least the first portion of injected water. The surfactant interacts with clays in the formation to reduce the permeability of the formation to the flood water and thereby improve the mobility ratio of the flooding process, resulting in a better sweep efficiency of the flooding medium through the reservoir.

22 Claims, No Drawings ized to 4,187,907

WATERFLOOD METHOD USING SURFACTANTS

This a continuation, of application Ser. No. 810,129, filed June 27, 1977 now abandoned.

BACKGROUND OF THE INVENTION

This invention relates to the recovery of oil by waterflooding from an oil-bearing subsurface formation where said subsurface formation also contains water-sensitive clays.

Oil may be recovered from an oil-bearing subsurface formation by the well-known process of waterflooding. This process basically involves the injection of water into the formation by means of one or more injection wells to physically displace or push oil to production wells. Various improvements have been made in the waterflooding art and have become standard practice. For example, it is well-known to add surfactants to flood water to reduce the interfacial tension between the floodwater and the oil which is to be displaced. It is also well-known that the mobility of the driving fluid, i.e., the floodwater, should be lower than the mobility of the driven fluid, i.e., oil, at least at the interface where these two fluids meet. In other words, a mobility ratio, defined as the mobility of the driving fluid divided by the mobility of the driven fluid, of less than unity is preferred since this prevents the driving fluid from fingering through or bypassing the driven fluid.

The above and other features of the waterflooding art are discussed in more detail in U.S. Pat. No. 3,407,956 issued to Boston, et al., on Oct. 7, 1969, and U.S. Pat. No. 3,677,344 issued to Hayes, et al., on July 18, 1972. These two patents are hereby incorporated by reference. In both of these patents it is recognized that mobility control can be exercised by modification of formation permeability in addition to the more well-known method of modification of fluid viscosity. Mobility is simply the permeability of a formation to a fluid divided by the fluid's viscosity. Mobility may be reduced by either increasing viscosity or decreasing permeability, or doing both. In both of these patents, permeability of the formation to the driving fluid is reduced by interaction with clays present in the more permeable portions of the formation. As defined in these patents, and as used here the term, "water-sensitive clays," includes any clay which swells and/or disperses or in any other way interacts with fresh water to reduce the formation permeability.

In the Hayes patent the mobility of a plurality of banks of flood fluids is successively reduced by reducing the salinity of each bank of fluid. In addition, some of the fluids have polymer thickeners added to increase fluid viscosity. While the Hayes patent involves a process beginning with injection of a micellar fluid to remove oil, the Boston patent deals with a more conventional waterflood having a surfactant added to reduce interfacial tension between the floodwater and the oil being driven through the formation. Disclosed in the Boston patent is the fact that a surfactant solution, including preferably a hydrocarbon sulfonate, having a salinity less than the normal formation salinity, interacts with water-sensitive clays in the formation to reduce formation permeability even when the salinity of the water is sufficiently high that the water alone will not be expected to cause such clay interactions. Thus, it is seen that in both Hayes and in Boston it is taught that a reduction of floodwater salinity below normal formation salinity is essential to the process of reducing formation permeability by in the interactions with clays naturally present in the formation.

SUMMARY OF THE INVENTION

Accordingly, an object of the present invention is to provide a method for reducing the permeability of a subsurface formation to the flow of an aqueous flooding medium by means of clay interactions without the reduction of floodwater salinity below formation water salinity.

According to the present invention, floodwater mobility is reduced by the addition of a low concentration of a surfactant, preferably a hydrocarbon sulfonate, to at least a first portion of a bank of floodwater. The surfactant alone causes a substantial reduction in formation permeability to the floodwater in the regions of the formation where water-sensitive clays are present without the reduction of floodwater salinity below the salinity of water in the formation.

DESCRIPTION OF THE PREFERRED EMBODIMENT

It is known that fresh water can interact with finely divided materials, such as clays, to reduce formation permeability to water. The prior art contains a number of explanations of the interactions. No attempt is made here to better define this clay interaction. As defined above and used here, the term "water-sensitive clays" includes any clays which interact in some way with fresh water to reduce formation permeability.

While generally speaking it is not desirable to reduce the permeability of the formation from which fluids are being produced or through which fluids are being driven, the above-referenced Boston and Hayes patents illustrate that permeability reduction can be used to advantage in certain circumstances. For example, formation permeability to a driving floodwater may be reduced by clay interactions without reducing formation permeability to the oil which is driven by the water. The flow capacity of a high-permeability stratum may be reduced to more closely match other strata.

We have discovered, contrary to prior teachings, that clay interactions occur and formation permeability is reduced when the formation is exposed to a surfactant, even when the water in which the surfactant is contained has a salinity level as high as the naturally occurring salinity in the formation water or a previously injected floodwater. This discovery resulted from experiments intended to demonstrate methods of increasing formation permeability by removal of residual oil which was trapped in the formation rock. As will be shown by the examples below, even when residual oil was totally removed by means of surfactant or micellar solutions, formation permeability did not return to original specific water permeability levels.

EXAMPLE 1

A core plug was obtained from the Second Wall Creek Formation, Salt Creek, Wyoming, and preserved in its native-state water and oil saturations up to the time that water-oil relative permeability tests were run. At the end of the water-oil relative permeability tests, the core plug had a residual oil saturation of 18.7% of pore space. The core plug was then flushed with 10 to 15 pore volumes (PV) of synthetic Platte River water with 0.2 N NaCl added. At the end of this simulated waterflood the core plug had a permeability to the Platte River water with 0.2 N NaCl of 4.5 md which was 31.3% of the maximum initial permeability of the core plug to oil. The core plug was then flushed with 10 to 15 PV of a miscellar fluid composed of 5% Mahogany AA sulfonate, 3% isopropyl alcohol, 500 ppm NH CNS, and 92% synthetic Platte River water with 0.2 N NaCl added. At the end of the miscellar solution flush, oil saturation was reduced to zero and the core plug permeability to the micellar solution itself was 5.9 md or only 41% of the maximum permeability. The core plug was again flushed with 10 to 15 PV of Platte River water with 0.2 N NaCl and permeability was found to be 5.3 md or 36.8% of expected maximum value. Following this, the core plug was flushed with Platte River water only and found to have a permeability of 4.5 md or 31.3% of expected maximum value.

While the original purpose of this test was to show that formation permeability could be greatly increased by removal of all residual oil to improve the injectivity of water injection wells, the test was a failure in this respect. Although all residual oil was effectively removed, the permeability to the identical water injected before and after the removal of the oil increased from only 4.5 to 5.3 md and the maximum was only 36.8% of the expected permeability at zero oil saturation. While the removal of residual oil did tend to increase permeability, the interaction of water-sensitive clays in the core plug with the surfactant solution caused a permeability reduction which nearly completely offset the increase due to removal of oil. When the Platte River water only, without any added NaCl, was injected, the permeability fell back to exactly its original floodout water permeability, illustating the effect of further clay interactions caused by the introduction of fresher water.

To illustrate that the core plug involved in the above example did in fact contain water-sensitive clay, other samples from the same formation were tested later by means of x-ray diffraction analysis and scanning electron microphotography. The x-ray diffraction analysis showed that the core plug contained montmorillonite in addition to other clays. Montmorillonite is recognized as an expanding clay that will take fresh water into its crystal lattice. This expansion was confirmed by an actual test on known montmorillonite samples which expanded from 11.8 angstroms to 18 angstrom, upon contact with a micellar fluid similar to that used in the above example. As taught by the above-referenced Hayes and Boston patents, the swelling of water-sensitive clays upon contact with fresher water is believed to be one of the mechanisms by which formation permeability is reduced. This example tends to support this explanation.

EXAMPLE 2

Another core plug was obtained from the Second Wall Creek Formation for a test in which only surfactant in low concentration was used. This core was first flooded with a synthetic brine containing 0.2 N NaCl and a permeability of 27.1 md was measured. This core was then flooded with Torchlight crude oil to saturation. A second waterflood of the same synthetic brine was made and permeability at residual oil saturation was measured at 17.3 md. A surfactant flood comprising the synthetic brine with 1 percent sodium dodecylbenzene sulfonate added was then made. The surfactant flood displaced only a trace of the residual oil but also produced a cloudy fluid. Permeability to the surfactant flood was measured at 10.4 md. The resulting cloudy fluid was analyzed by scanning electron microscope and found to contain traces of kaolinite and montmorillonite. The plug was then waterflooded with the brine a third time and permeability was measured at 9.1 md. This third water-flood also produced a cloudy fluid, which was analyzed by the scanning electron microscope and found to also contain traces of kaolinite and montmorillonite. This test shows that permeability to the identical brine decreased after treatment with a weak surfactant flood in which salinity was maintained constant. The presence of clays in the produced fluids indicates that the mechanism of permeability reduction in this test may have been dispersion of particles within the core.

Other tests similar to the above two examples were performed using test cores from a Tertiary Kenai formation in the Granite Point Reservoir, Cook Inlet, Alaska. These cores were analyzed and found to contain relatively large percentages of kaolinite, montmorillonite, illite, and chlorite. These cores were flooded with a sulfonate-type micellar fluid similar to that used in Example 1 above and also with 1% solutions of two commercial surfactants, Amoco Chemical Company type Wellaid 711-W and Guardian Chemical Corporation type polycomplex A-11. The 711-W surfactant is approximately 37% ethylene oxide adduct of nonyl phenol and 30% isopropyl alcohol with the remainder water. The alcohol was added to prevent freezing since the intended use was in Alaska, and the product is normally available without the alcohol. The A-11 surfactant is apparently a proprietary product commercially available from Guardian Chemical Corporation, Long Island City, N.Y. 11101. Only the micellar fluid significantly reduced the residual oil saturation, but all of the fluids caused some reduction in permeability. As with Example 1, these tests were intended to demonstrate that well injectivity could be improved by removal of residual oil, but failed in this respect even when residual oil was removed. These tests demonstrate that surfactants other than the sulfonates produce a permeability reduction.

As can be seen from the above examples, the present invention involves the reduction is permeability of a formation simply by the exposure of the formation to a surfactant. In the first example, the formation permeability remained unchanged after removal of residual oil, which was expected to increase permeability. In the second example, formation permeability to the same floodwater was reduced substantially by exposure of the formation to a surfactant lower in concentration than that needed to move oil by reduction of interfacial tension. Thus, the present invention may be practiced in a number of beneficial ways. In operating waterfloods, it sometimes happens that high-permeability zones carry a large proportion of the floodwater from the injection well to a production well. Where it also occurs that the high-permeability zone contains water-sensitive clays, an addition of a small amount of surfactant to the floodwater will reduce the permeability of the high-permeability zone and force more water through other zones. The same treatment in the initial stage of a waterflood can also be used to prevent the early breakthrough of water due to the high-permeability zones. In some floods, viscosity enhancers, such as polymers, are added to the water to improve the mobility ratio of the flood. If a small amount of surfactant is added to the driving fluid in formations containing water-sensitive clays, formation permeability will be reduced and mobility ratio further improved. Alternatively, in such a case less of the expensive polymer would be required to achieve the same mobility ratio.

In addition to being useful in a number of different flooding operations, the mobility ratio improvement of the present invention may be combined with other methods such as the polymer viscosity enhancement mentioned above. Reduction in water salinity may also be combined with the addition of surfactant to reduce permeability, as shown by Example 1 above. While the above Boston patent indicates that a three-step process is needed to obtain a permeability reduction by the combined action of surfactant and salinity reduction, Example 1 above shows that the effects are independent. The final step of Example 1 caused a permeability reduction by salinity reduction after the test core had been flushed with at least ten pore volumes of higher salinity brine.

Although the present invention has been described in terms of specific processes, it will be apparent that changes or modifications can be made within the scope of the invention as defined by the appended claims.

We claim:

1. A method for improving the sweep efficiency of an oil recovery waterflood comprising injecting into an earth formation having at least one stratum of the formation which contains water-sensitive clays and has a higher permeability than another stratum of said formation that does not contain water-sensitive clays by means of an injection well a slug of floodwater having salinity substantially the same as native formation water and containing surfactant in an amount less than that required to cause a substantial reduction in interfacial tension between water and oil.

2. A method according to claim 1 wherein the surfactant is hydrocarbon sulfonate.

3. A process according to claim 1 further including the step of displacing the slug of floodwater containing surfactant toward a production well by injecting floodwater into the injection well and recovering crude oil from the production well.

4. A method for improving the sweep efficiency of an oil recovery waterflood comprising injecting into an earth formation having at least one stratum of the formation which contains water-sensitive clays and has a higher permeability than another stratum of said formation that does not contain water-sensitive clays by means of an injection well a slug of floodwater having salinity substantially the same as previously injected floodwater and containing surfactant in an amount less than that required to cause a substantial reduction in interfacial tension between water and oil.

5. A method according to claim 4 wherein the surfactant is a hydrocarbon sulfonate.

6. A process according to claim 4 further including a step of displacing the slug of floodwater containing surfactant toward a production well by injecting floodwater into the injection well and recovering crude oil from the production well.

7. A process according to claim 6 wherein the slug of floodwater containing surfactant is displaced toward the production well by floodwater having salinity lower than that of previously injected floodwater.

8. A method of reducing the permeability of an oil-bearing formation containing water sensitive clay to the flow of an aqueous flooding medium comprising injecting into said formation an aqueous flooding medium having substantially the same salinity as the connate water in said formation and containing surfactant in an amount less than that required to cause a substantial reduction in interfacial tension between water and oil, whereby said clay reacts with said medium to result in reduced permeability of said formation.

9. In an oil recovery process in which water is injected into a plurality of subsurface strata by means of an injection well and oil is produced from said strat by means of a production well and one of said strata has permeability higher than the other strata so that the high permeability stratum carries a disproportionate share of water from said injection well to said production well and in which said high permeability stratum contains water-sensitive clays, the improvement comprising injecting into said strata by means of said injection well a slug of floodwater having the same salinity as previously injected floodwater and containing surfactant in an amount less than that required to cause a substantial reduction in interfacial tension between water and oil, whereby the permeability of said high permeability strata is reduced and the share of injected water carried by said high permeability zone is reduced.

10. A method of reducing the permeability of a permeable, oil-bearing formation containing water-sensitive clay to the flow of an aqueous flooding medium comprising injecting into said formation an aqueous flooding medium containing surfactant and having sufficient salinity that a combination of water and salt alone having such a salinity would not interact with water-sensitive clays in said formation to reduce the permeability of said formation and displacing said aqueous flooding medium through said formation, wherein said aqueous flooding medium does not contain an appropriate surfactant concentration and salinity level to significantly reduce the oil content of the formation.

11. In an oil recovery process in which an aqueous flooding medium is injected into subsurface strata by means of at least one injection well penetrating said strata and is displaced through said strata such that oil is produced therefrom by means of at least one production well penetrating said strata and being in fluid communication through said strata with said at least one injection well and at least one portion of said strata has a permeability higher than other portions of said strata so that said at least one higher permeability portion carries a disproportionate share of the aqueous flooding medium from said at least one injection well to said at least one production well and in which said at least one higher permeability portion contains water-sensitive clays, the improvement comprising injecting into said strata by means of said at least one injection well an aqueous flooding medium containing surfactant and having sufficient salinity that a combination of water and salt alone having such a salinity would not interact with water-sensitive clays in said formation to reduce the permeability of said formation, wherein said aqueous flooding medium does not contain an appropriate surfactant concentration and salinity level to significantly reduce the oil content of the formation.

12. A method of reducing the permeability of a permeable, oil-bearing formation containing water-sensitive clay to the flow of an aqueous flooding medium comprising injecting into said formation an aqueous flooding medium containing surfactant in an amount less than that required to significantly reduce the oil content of the formation and having sufficient salinity that a combination of water and salt alone having such a salinity would not interact with water-sensitive clays in said formation to reduce the permeability of said formation and displacing said aqueous flooding medium through said formation.

13. In an oil recovery process in which an aqueous flooding medium is injected into subsurface strata by means of at least one injection well penetrating said strata and is displaced through said strata such that oil is produced therefrom by means of at least one production well penetrating said strata and being in fluid communication through said strata with said at least one injection well and at least one portion of said strata has a permeability higher than other portions of said strata so that said at least one higher permeability portion carries a disproportionate share of the aqueous flooding medium from said a least one injection well to said at least one production well and in which said at least one higher permeability portion contains water-sensitive clays, the improvement comprising injecting into said strata by means of said at least one injection well an aqueous flooding medium containing surfactant in an amount less than that required to significantly reduce the oil content of the formation and having sufficient salinity that a combination of water and salt alone having such a salinity would not interact with water-sensitive clays in said formation to reduce the permeability of said formation.

14. A method of reducing the permeability of a permeable, oil-bearing formation containing water-sensitive clay to the flow of an aqueous flooding medium comprising injecting into said formation an aqueous flooding medium containing surfactant and having salinity at least as high as the formation water salinity and displacing said aqueous flooding medium through said formation, wherein said aqueous flooding medium does not contain an appropriate surfactant concentration and salinity level to significantly reduce the oil content of the formation.

15. In an oil recovery process in which an aqueous flooding medium is injected into subsurface strata by means of at least one injection well penetrating said strata and is displaced through said strata such that oil is produced therefrom by means of at least one production well penetrating said strata and being in fluid communication through said strata with said at least one injection well and at least one portion of said strata has a permeability higher than other portions of said strata so that said at least one higher permeability portion carries a disproportionate share of the aqueous flooding medium from said at least one injection well to said at least one production well and in which said at least one higher permeability portion contains water-sensitive clays, the improvement comprising injecting into said strata by means of said at least one injection well an aqueous flooding medium containing surfactant and having salinity at least as high as the formation water salinity, wherein said aqueous flooding medium does not contain an appropriate surfactant concentration and salinity level to significantly reduce the oil content of the formation.

16. A method of reducing the permeability of a permeable, oil-bearing formation containing water-sensitive clay to the flow of an aqueous flooding medium comprising injecting into said information an aqueous flooding medium containing surfactant in an amount less than that required to significantly reduce the oil content of the formation and having salinity at least as high as the formation water salinity and displacing said aqueous flooding medium through said formation.

17. In an oil recovery process in which an aqueous flooding medium is injected into subsurface strata by means of at least one injection well penetrating said strata and is displaced through said strata such that oil is produced therefrom by means of at least one production well penetrating said strata and being in fluid communication through said strata with said at least one injection well and at least one portion of said strata has a permeability higher than other portions of said strata so that said at least one higher permeability portion carries a disproportionate share of the aqueous flooding medium from said at least one injection well to said at least one production well and in which said at least one higher permeability portion contains water-sensitive clays, the improvement comprising injecting into said strata by means of said at least one injection well an aqueous flooding medium containing surfactant in an amount less than that required to significantly reduce the oil content of the formation and having salinity at least as high as the formation water salinity.

18. A method of claims 14, 15, 16, or 17, wherein said formation water is connate water.

19. A method of claims 14, 15, 16, or 17, wherein said formation water is native formation water.

20. A method of claims 14, 15, 16, or 17, wherein said formation water is previously injected floodwater.

21. A method of claims, 10, 11, 12, 13, 14, 15, 16, or 17, wherein said aqueous flooding medium contains a hydrocarbon sulfonate surfactant.

22. A method of claims 1, 4, 8, 9, 10, 11, 12, 13, 14, 15, 16, or 17, wherein said aqueous flooding medium contains a petroleum-derived sulfonate surfactant.

* * * * *